(12) United States Patent
Zou

(10) Patent No.: US 11,027,228 B1
(45) Date of Patent: Jun. 8, 2021

(54) FILTRATION DEVICE AND FILTRATION ASSEMBLY

(71) Applicant: Qingdao Ecopure filter co., Ltd, Qingdao (CN)

(72) Inventor: Zhibin Zou, City of Industry, CA (US)

(73) Assignee: QINGDAO ECOPURE FILTER CO., LTD., Qingdao (CN)

(*) Notice: Subject to any disclaimer, the term of this patent is extended or adjusted under 35 U.S.C. 154(b) by 104 days.

(21) Appl. No.: 15/966,168

(22) Filed: Apr. 30, 2018

(51) Int. Cl.
| | |
|---|---|
| *C02F 1/28* | (2006.01) |
| *C02F 1/42* | (2006.01) |
| *B01D 35/30* | (2006.01) |
| *C02F 1/00* | (2006.01) |
| *C02F 9/00* | (2006.01) |

(52) U.S. Cl.
CPC .............. *B01D 35/30* (2013.01); *C02F 1/003* (2013.01); *C02F 1/42* (2013.01); *B01D 2201/302* (2013.01); *B01D 2201/304* (2013.01); *C02F 1/283* (2013.01); *C02F 9/005* (2013.01); *C02F 2001/427* (2013.01); *C02F 2201/004* (2013.01); *C02F 2201/006* (2013.01); *C02F 2307/04* (2013.01)

(58) Field of Classification Search
CPC ...... B01D 24/008; B01D 24/04; B01D 24/06; B01D 24/12; B01D 24/22; B01D 27/02; B01D 35/30; B01D 2201/302; B01D 2201/304; C02F 1/003; C02F 1/283; C02F 1/42; C02F 2001/427; C02F 9/005; C02F 2101/004; C02F 2101/006; C02F 2307/04; C02F 2201/004; C02F 2201/006
See application file for complete search history.

(56) References Cited

U.S. PATENT DOCUMENTS

| | | | | |
|---|---|---|---|---|
| 5,635,063 | A * | 6/1997 | Rajan ........................ | C02F 1/28 210/266 |
| 2004/0060873 | A1* | 4/2004 | Yanou ..................... | B01D 61/16 210/660 |
| 2010/0068343 | A1* | 3/2010 | Johann ..................... | C02F 1/003 426/66 |
| 2014/0083924 | A1* | 3/2014 | Bergendal ............... | C02F 1/003 210/451 |
| 2017/0050127 | A1* | 2/2017 | Dani ........................ | C02F 1/003 |

FOREIGN PATENT DOCUMENTS

DE       102007033337 A1 *  1/2009  .............. C02F 1/003

OTHER PUBLICATIONS

Rohm Haas, Product Data Sheet for Amberlite IRN160, Sep. 1999, Rohm and Haas Company, 2 pages. (Year: 1999).*

* cited by examiner

*Primary Examiner* — Matthew O Savage
(74) *Attorney, Agent, or Firm* — Calfee Halter & Griswold LLP

(57) ABSTRACT

The present application discloses a filtration device. The filtration device comprises a housing, a lid and a filtration material. The housing comprises at least one outlet hole at a bottom of the housing. The lid is coupled to the housing and comprises at least one inlet hole at a top of the lid. The filtration material is disposed within the housing and comprises a top layer, a particulate treatment layer, an activated carbon fiber layer and a bottom layer. The particulate treatment layer is coupled to the top layer. The activated carbon fiber layer is coupled to the particulate treatment layer. The bottom layer is coupled between the activated carbon fiber layer and the bottom of the housing. A filtration assembly is also disclosed in the present application.

15 Claims, 6 Drawing Sheets

FILTRATION DEVICE AND FILTRATION ASSEMBLY

TECHNICAL FIELD OF THE INVENTION

The present application generally relates to a liquid treatment device and assembly, and more particularly, to a filtration device and a filtration assembly.

BACKGROUND OF THE INVENTION

Most gravity-driven liquid treatment apparatus use activated carbon granular and resin as the reduction material of a gravity-driven water treatment apparatus. However, the life time for the above apparatus is not long. In addition, the current filter is generally columnar with one set of concentric inlet holes and outlet holes, making the filtration inefficient.

Therefore, a need remains for a filtration device and a filtration assembly to provide a more durable and more efficient way for filtering.

SUMMARY OF THE INVENTION

The present application discloses a filtration device and a filtration assembly for providing a more durable and more efficient way for filtering.

The filtration device comprises a housing, a lid and a filtration material. The housing comprises at least one outlet hole at a bottom of the housing. The lid is coupled to the housing and comprises at least one inlet hole at a top of the lid. The filtration material is disposed within the housing and comprises a top layer, a particulate treatment layer, an activated carbon fiber layer and a bottom layer. The particulate treatment layer is coupled to the top layer. The activated carbon fiber layer is coupled to the particulate treatment layer. The bottom layer is coupled between the activated carbon fiber layer and the bottom of the housing.

In various exemplary embodiments, the particulate treatment layer comprises a mixed bed of cationic resin and anionic resin. The cationic resin comprises hydrogen form or sodium form ion exchange resin.

In various exemplary embodiments, the particulate treatment layer comprises a water softener.

In various exemplary embodiments, the lid comprises two sets of inlets, each set of inlets comprises a plurality of ring-arranged inlet holes. The housing comprises two sets of outlets, each set of outlets comprises a plurality of ring-arranged outlet holes. The two sets of outlets are orthographic projections of the two sets of inlets.

In various exemplary embodiments, the lid comprises two sets of inlets and a handle. Each set of inlets comprises a plurality of ring-arranged inlet holes. The handle is located between the two sets of the inlets.

According to an exemplary embodiment of the filtration device, the top layer and the bottom layer are nonwoven fabric layers.

According to the other exemplary embodiment, the top layer and the bottom layer are filter sheets.

The present application also discloses a filtration assembly. The filtration assembly comprises a case and a filtration device located inside the case. The filtration device comprises a housing, a lid and a filtration material. The housing comprises at least one outlet hole at a bottom of the housing. The lid is coupled to the housing and comprises at least one inlet hole at a top of the lid. The filtration material is disposed within the housing and comprises a top layer, a particulate treatment layer, an activated carbon fiber layer and a bottom layer. The activated carbon fiber layer is coupled to the top layer. The activated carbon fiber layer is coupled to the particulate treatment layer. The bottom layer is coupled between the activated carbon fiber layer and the bottom of the housing.

In various exemplary embodiments, the particulate treatment layer comprises a mixed bed of cationic resin and anionic resin. The cationic resin comprises hydrogen form or sodium form ion exchange resin.

In various exemplary embodiments, the particulate treatment layer comprises a water softener.

According to an exemplary embodiment of the filtration assembly, the top layer and the bottom layer are nonwoven fabric layers.

According to the other exemplary embodiment, the top layer and the bottom layer are filter sheets.

In various exemplary embodiments, the lid comprises two sets of inlets, each set of inlets comprises a plurality of ring-arranged inlet holes. The housing comprises two sets of outlets, each set of outlets comprises a plurality of ring-arranged outlet holes. The two sets of outlets are orthographic projections of the two sets of inlets.

Based on the above, the filtration device of the present application provides more durable way for filtering by utilizing the activated carbon fiber. Specifically, the capacity of general filtration device which uses activated carbon granular is about 50 gallons. However, the capacity of the filtration device of the present application may reach 200 gallons. In addition, the filtration efficiency may also increase due to the two sets of inlets and outlets, allowing the raw liquid to be filtered bilaterally.

Numerous other advantages and features of the present application will become readily apparent from the following detailed description of disclosed embodiments, from the claims and from the accompanying drawings.

BRIEF DESCRIPTION OF THE DRAWINGS

The objects, features and advantages of the present application will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF DISCLOSED EMBODIMENTS

Figure 1:
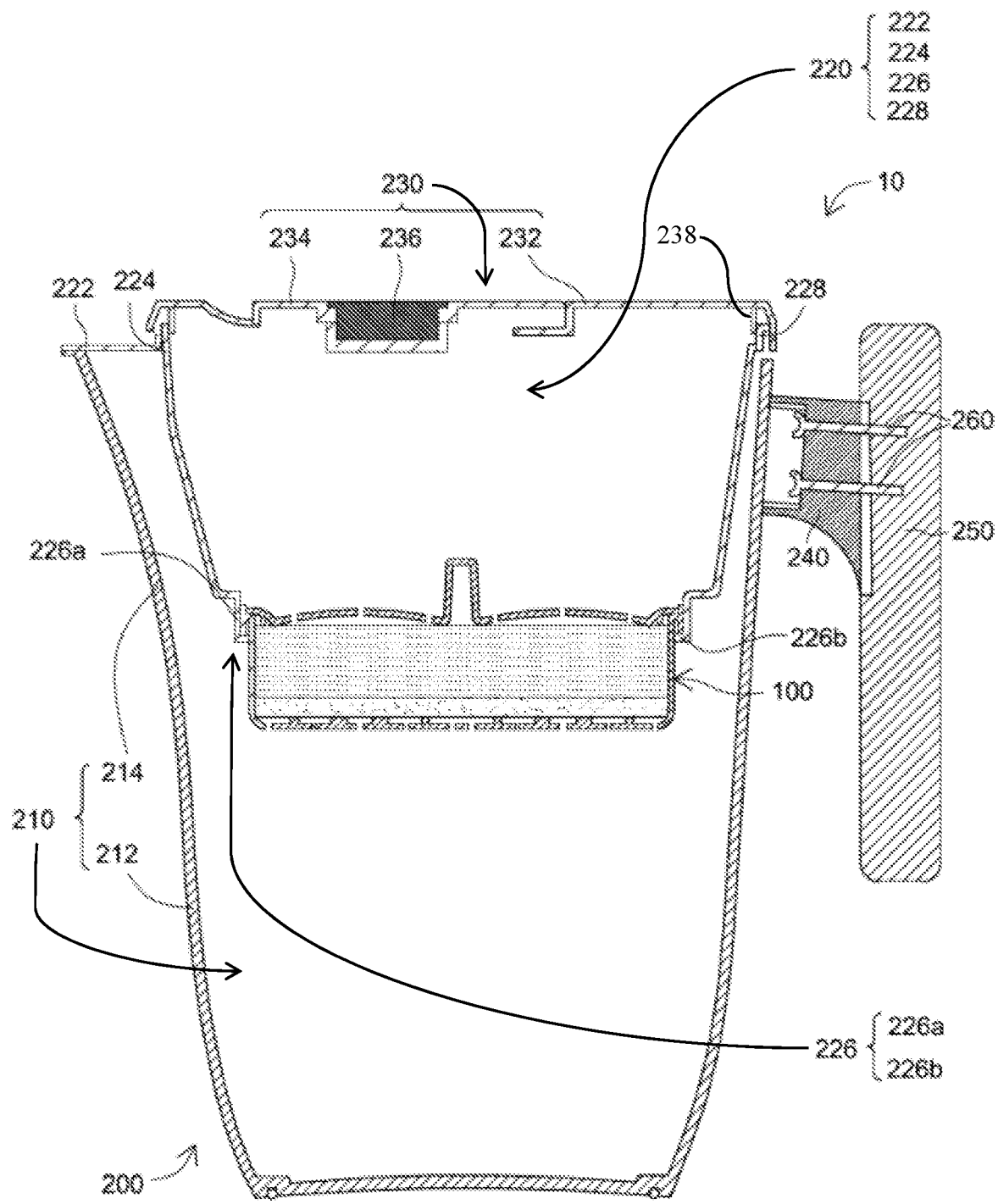
FIG. 1 is a cross-sectional view of a filtration assembly in a closed-mode.

Reference will now be made in detail to the present representative embodiments of the present application, examples of which are illustrated in the accompanying drawings. Wherever possible, the same reference numbers are used in the drawings and the description to refer to the same or like parts.

A filtration assembly and a filtration device in the present application can filtrate any kind of liquid, the present application uses water here as an example. However, the present application is not limited thereto.

Figure 2:
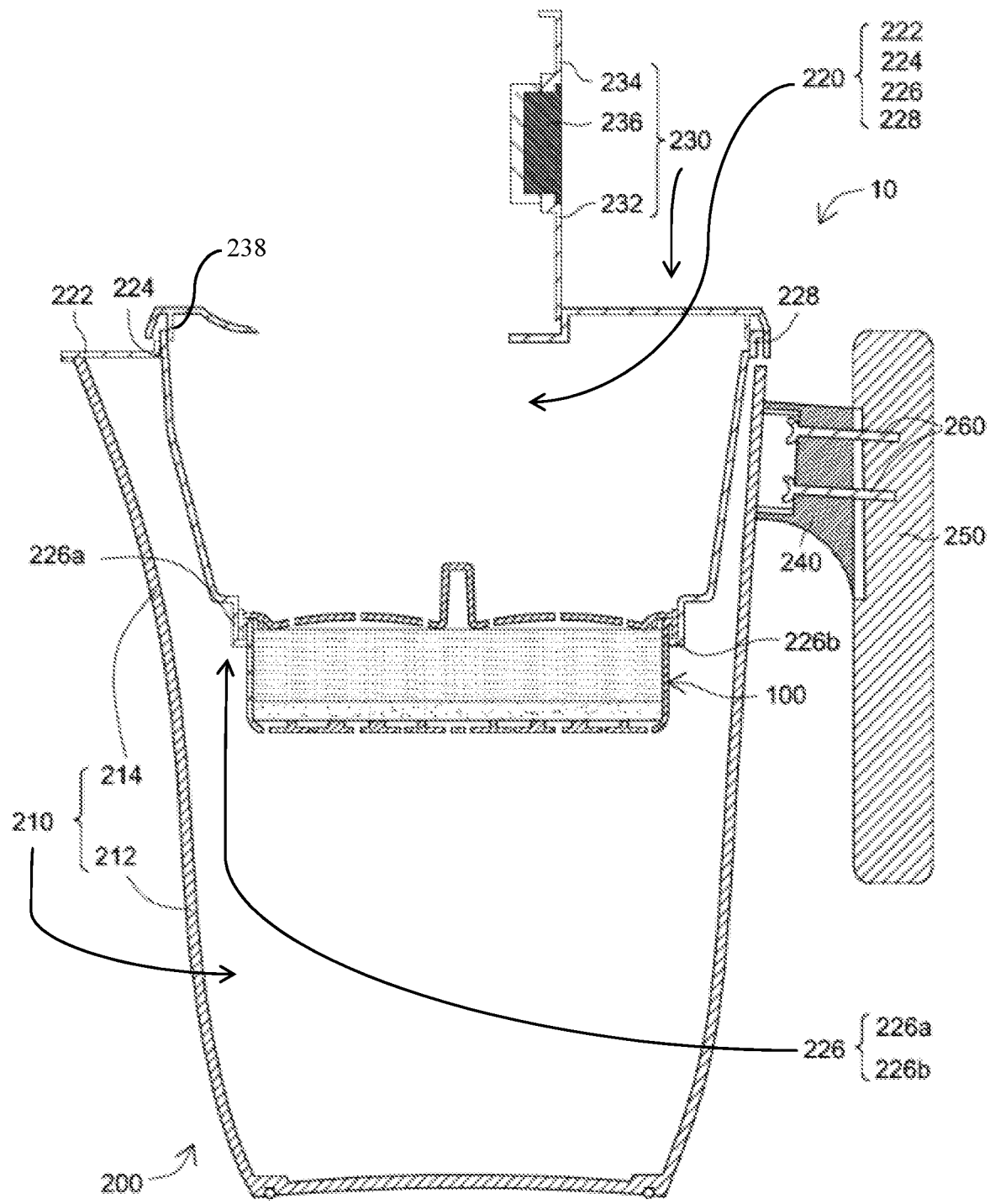
FIG. 2 is another cross-sectional view of the filtration assembly in an opened-mode.

FIG. 1 is a cross-sectional view of a filtration assembly 10 in a closed-mode. FIG. 2 is another cross-sectional view of the filtration assembly 10 in an opened-mode.

Referring to FIGS. 1-2, the filtration assembly 10 comprises the filtration device 100 and a case 200. The case 200 comprises a reservoir 210, a reservoir 220, a lid 230, a connector 240, a handle 250 and screws 260.

Specifically, the reservoir 210 is a purified water reservoir, and the reservoir 220 is an original water reservoir. The reservoir 210 comprises a body 212 and an outlet 214. The body 212 and the outlet 214 are molded integrally. However, the present application is not limited thereto, the body 212 and the outlet 214 also can be manufactured separately and combined thereafter. In addition, a bottom of the body 212 may comprise an anti-slip food pad.

The reservoir 220 comprises a blocker 222, a body 224, a supporter 226 and a flange 228. The cover 230 comprises a main body 232, a lid 234, an indicator 236 and the rib 238.

The blocker 222 is located on the outlet 214 when disposing the reservoir 220 within the reservoir 210. The blocker 222 is rotatably coupled with the body 224. The supporter 226 is an opening 226a extending downwardly with a flange 226b at a bottom of the opening 226a. The supporter 226 is capable of supporting the filtration device 100 by locating a lid 120 (referring to FIG. 3) of the filtration device 100 onto the flange 226b. The cover 230 can be coupled with the reservoir 220 by stucking the flange 228 into a groove of the cover 230, which located between the rib 238 and an edge of the main body 232.

The lid 234 is openable for original water to pour in the reservoir 220 as shown in FIG. 2. The indicator 236 comprises a screen which can show the life expectancy of the filtration device 100. Specifically, the user can press the start button on the indicator 236 after installing the new filtration device 110. The screen will show the number of remaining days. For example, "90" shown in the screen 236 means the filtration device 100 has 90 days of life before replacement.

The connector 240 is coupled to the reservoir 210 by glue. The handle 250 is coupled to the connector 250 by the screws 260. The handle 250 in the present application is a wooden handle for isolating high/low temperature. However, the present application is not limited thereto, the handle 250 can be made of any kind of material. In addition, although the connector 240, the handle 250 and the reservoir 210 are manufactured separately and coupled together thereafter, the present application is not limited thereto. The connector 240, the handle 250 and the reservoir 210 can be molded integrally.

Figure 3:
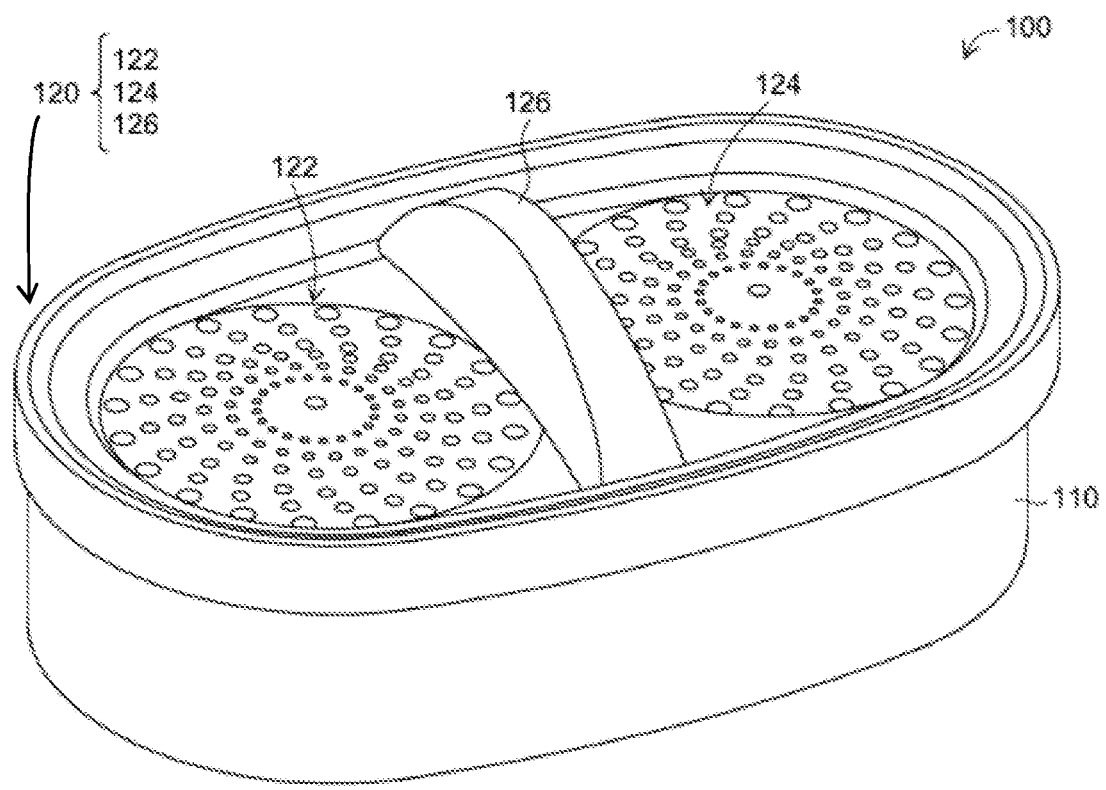
FIG. 3 is a perspective view of a filtration device.
Figure 4:
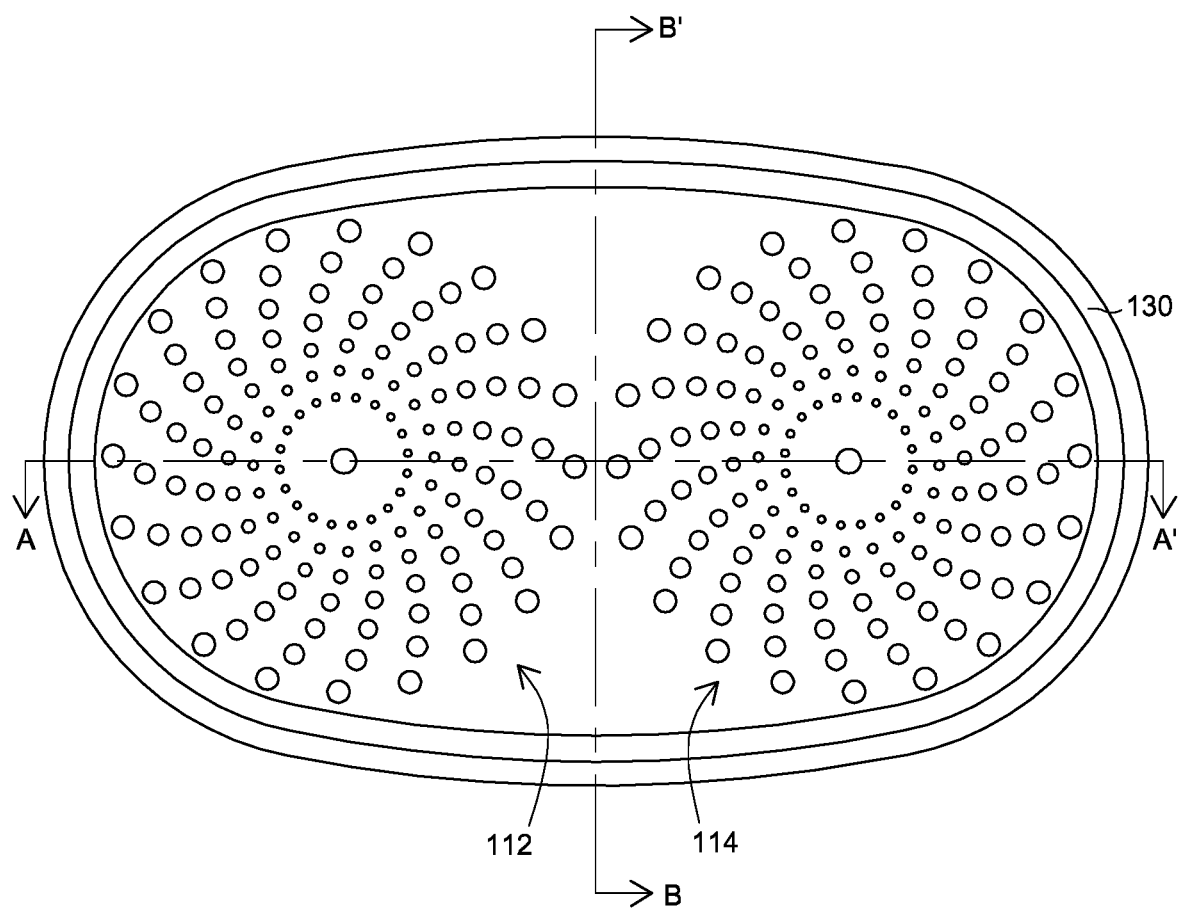
FIG. 4 is a bottom view of the filtration device.
Figure 5:
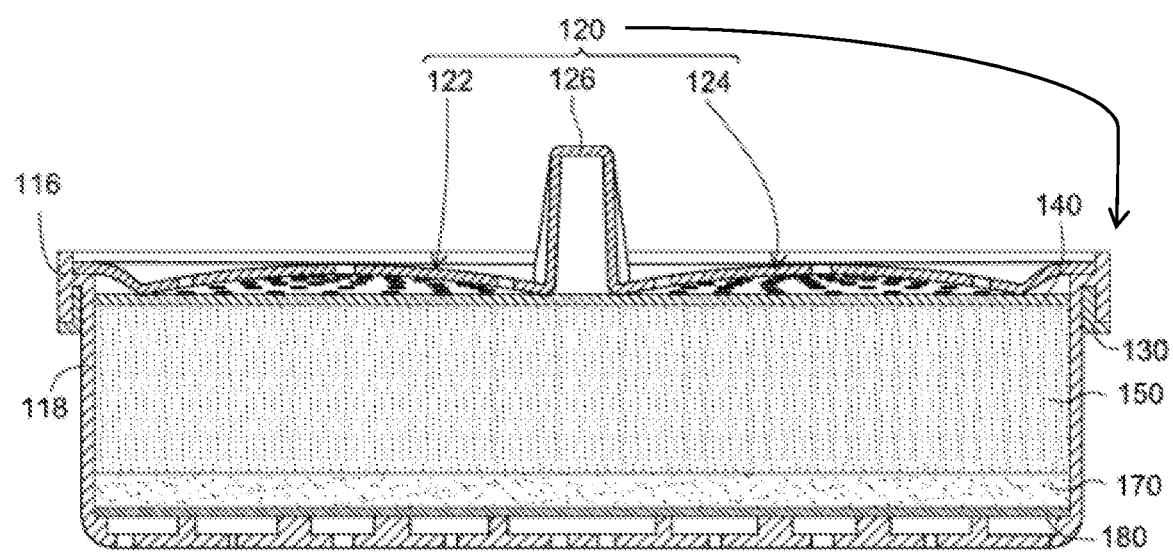
FIG. 5 is a cross-sectional view through an A-A' plane of the filtration device of FIG. 4.
Figure 6:
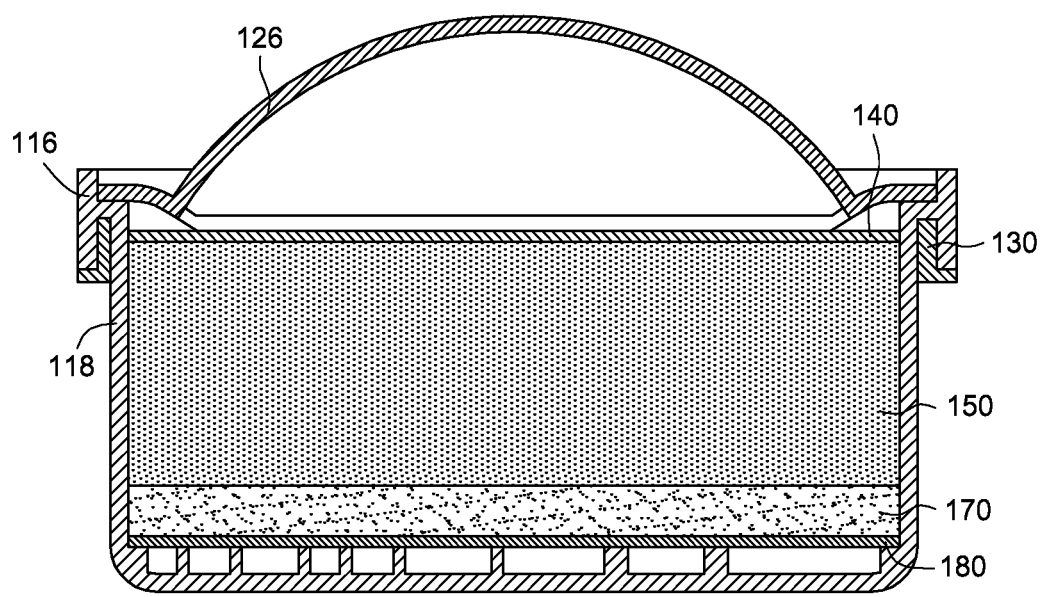
FIG. 6 is another cross-sectional view through an B-B' plane of the filtration device of FIG. 4.

FIG. 3 is a perspective view of a filtration device 100. FIG. 4 is a bottom view of the filtration device 100. FIG. 5 is a cross-sectional view through an A-A' plane of the filtration device 100 of FIG. 4. FIG. 6 is another cross-sectional view through an B-B' plane of the filtration device 100 of FIG. 4.

Referring to FIGS. 3-4, the filtration device 100 comprises a housing 110, the lid 120 and a seal 130. The housing 110 comprises at least one outlet hole at a bottom. Specifically, the housing 110 comprises two sets of outlets 112/114. Each set of outlets 112/114 comprises a plurality of ring-arranged outlet holes. The plurality of ring-arranged outlet holes are arranged spirally. In addition, the diameter of the outlet holes gradually increases from inside to outside.

The lid 120 comprises a handle 126 and at least one inlet hole at a top. Specifically, the lid 120 comprises two sets of inlets 122/124. The handle 126 is located between the two sets of the inlets 122/124. The plane of the lid 120 for each of the two sets of the inlets 122/124 are convex (referring to FIG. 5).

Each set of inlets 122/124 comprises a plurality of ring-arranged inlet holes. The plurality of ring-arranged inlet holes are arranged spirally. In addition, the diameter of the inlet holes gradually increases from inside to outside. The two sets of outlets 112/114 are orthographic projections of the two sets of inlets 122/124.

By the above structure, rather than filtering only by one set of inlet and outlet as traditional filter device, the filtration device 100 of the present application can filter the water bilaterally, allowing the filtration efficiency being increased. In addition, the water flowing speed may also increase since the design of the plane of the lid 120 for each of the two sets of inlets 122/124 and the design for the diameter of the inlet holes and outlet holes.

Referring to FIGS. 5-6, the seal 130 is coupled to the housing 110 for disposing on the supporter 226 of the reservoir 220 (referring to FIG. 1) more stably. Specifically, the seal 130 is located at the groove between an edge 116 and a wall 118 of the housing 110 as shown in FIG. 4-5.

Referring to FIGS. 5-6, a filtration material is disposed within the housing 110. The filtration material comprises a top layer 140, a particulate treatment layer 150, an activated carbon fiber layer 170 and a bottom layer 180.

The top layer 140 may be nonwoven fabric layer or filter sheets such as sieve-like sheet, the present application is not limited thereto.

The particulate treatment layer 150 is coupled to the top layer 140 for removing inorganic and radiological contaminants in the water. Specifically, the particulate treatment layer 150 comprises a mixed bed of cationic resin and anionic resin. Depending on different purposes, the cationic resin may comprise hydrogen form ion exchange resin or sodium form ion exchange resin. In addition, the particulate treatment layer 150 may also comprise water softener, the present application is not limited thereto.

The activated carbon fiber 170 is coupled to the particulate treatment layer 150 for removing chlorine or organic contaminants. Unlike the traditional activated carbon granular, which can only filter about 50 gallons of water, the filtration device 100 of the present application may filter up to 200 gallons due to the activated carbon fiber layer 170.

The bottom layer 180 is coupled between the activated carbon fiber layer 170 and the bottom of the housing 110. The bottom layer 180 may be nonwoven fabric layer or filter sheets such as sieve-like sheet, the present application is not limited thereto.

Based on the above, the filtration device 100 of the present application provides more durable way for filtering by utilizing the activated carbon fiber. Specifically, the capacity of general filtration device which uses activated carbon granular is about 50 gallons. However, the capacity of the filtration device 100 of the present application may reach 200 gallons. In addition, the filtration efficiency may also increase due to the design of the plane of the lid 120 for each of the two sets of inlets 122/124 and the design for the diameter of the inlet holes and outlet holes, allowing the raw liquid to be filtered bilaterally and more efficiently.

It will be apparent to those skilled in the art that various modifications and variations can be made to the structure of the present application without departing from the scope or spirit of the present application. In view of the foregoing, it is intended that the present application cover modifications and variations of this application provided they fall within the scope of the following claims and their equivalents.

What is claimed is:

1. A filtration device, comprising:
a housing comprising at least one outlet hole at a bottom of the housing;
a lid coupled to the housing and comprising at least one inlet hole at a top of the lid; and
a filtration material disposed within the housing and at least comprising:
a top layer;
a particulate treatment layer coupled to the top layer;
an activated carbon fiber layer coupled to the particulate treatment layer; and
a bottom layer coupled between the activated carbon fiber and the bottom of the housing,
wherein the lid comprises two sets of inlets, each set of inlets comprises a plurality of inlet holes in a rotated spiral pattern,
wherein the housing comprises two sets of outlets, each set of outlets comprises a plurality of outlet holes in a rotated spiral pattern,
wherein the two sets of outlets are the same as orthographic projections of the two sets of inlets.

2. The filtration device as claimed in claim 1, wherein the particulate treatment layer comprises a mixed bed of cationic resin and anionic resin.

3. The filtration device as claimed in claim 2, wherein the cationic resin comprises hydrogen form ion exchange resin.

4. The filtration device as claimed in claim 3, wherein the cationic resin comprises sodium form ion exchange resin.

5. The filtration device as claimed in claim 1, wherein the particulate treatment layer comprises a water softener.

6. The filtration device as claimed in claim 1, wherein the lid further comprises a handle located between the two sets of the inlets.

7. The filtration device as claimed in claim 1, wherein the top layer and the bottom layer are nonwoven fabric layers.

8. The filtration device as claimed in claim 1, wherein the top layer and the bottom layer are filter sheets.

9. A filtration assembly, comprising:
a case; and
a filtration device located inside the case, comprising:
a housing comprising at least one outlet hole at a bottom of the housing;
a lid coupled to the housing and comprising at least one inlet hole at a top of the lid; and
a filtration material disposed within the housing and comprising:
a top layer;
a particulate treatment layer coupled to the top layer;
an activated carbon fiber layer coupled to the particulate treatment layer; and
a bottom layer coupled between the activated carbon fiber layer and the bottom of the housing,
wherein the lid comprises two sets of inlets, each set of inlets comprises a plurality of inlet holes in a rotated spiral pattern,
wherein the housing comprises two sets of outlets, each set of outlets comprises a plurality of outlet holes in a rotated spiral pattern,
wherein the two sets of outlets are the same as orthographic projections of the two sets of inlets.

10. The filtration assembly as claimed in claim 9, wherein the particulate treatment layer comprises a mixed bed of cationic resin and anionic resin.

11. The filtration assembly as claimed in claim 10, the cationic resin comprises hydrogen form ion exchange resin.

12. The filtration assembly as claimed in claim 11, the cationic resin comprises sodium form ion exchange resin.

13. The filtration assembly as claimed in claim 9, wherein the particulate treatment layer comprises a water softener.

14. The filtration assembly as claimed in claim 9, wherein the top layer and the bottom layer are nonwoven fabric layers.

15. The filtration assembly as claimed in claim 9, wherein the top layer and the bottom layer are filter sheets.

* * * * *